(12) United States Patent
Zeng et al.

(10) Patent No.: US 6,464,955 B2
(45) Date of Patent: *Oct. 15, 2002

(54) PRODUCTION OF HYDROGEN AND CARBON MONOXIDE

(75) Inventors: Yongxian Zeng, North Plainfield; Donald L. MacLean, Clinton; Satish S. Tamhankar, Scotch Plains; Narayanan Ramprasad, Bridgewater; Frank R. Fitch, Bedminster, all of NJ (US); Kirk Walton Limbach, Dresher, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,424

(22) Filed: May 13, 1999

(65) Prior Publication Data

US 2002/0064494 A1 May 30, 2002

(51) Int. Cl.⁷ .................................................. C01B 3/02
(52) U.S. Cl. ..................... 423/648.1; 423/650; 252/373
(58) Field of Search ..................... 252/373; 423/648.1, 423/650, 418.2, 230, 235.1, 239.1, 242.1; 95/107, 108, 138, 148; 96/150; 422/145, 144

(56) References Cited

U.S. PATENT DOCUMENTS

| | | | |
|---|---|---|---|
| 4,321,250 A | | 3/1982 | Hart |
| 5,149,516 A | | 9/1992 | Han et al. .................... 413/415 |
| 5,160,713 A | * | 11/1992 | Mazanec et al. ............ 423/210 |
| 5,571,492 A | | 11/1996 | Yao et al. .................... 423/263 |
| 5,693,212 A | | 12/1997 | Mazanec et al. |
| 5,714,091 A | | 2/1998 | Mazanec .................... 252/252 |
| 5,744,015 A | | 4/1998 | Mazanec et al. |
| 5,755,840 A | | 5/1998 | Beer .......................... 48/127.3 |
| 6,110,979 A | * | 8/2000 | Nataraj et al. .............. 518/704 |
| 6,143,203 A | | 11/2000 | Zeng et al. ................. 252/373 |

FOREIGN PATENT DOCUMENTS

| | | | |
|---|---|---|---|
| EP | 0 663 231 A2 | 5/1998 | |
| EP | 0 913 184 A1 | 6/1999 | ........... B01D/53/04 |
| EP | 0 995 715 A1 | 4/2000 | ............. C08B/3/38 |
| JP | 04164803 | * 10/1992 | |

OTHER PUBLICATIONS

"Vibration–Damping Sheet", Seiichi, A., *Patent Abstracts of Japan*, 05005044, Jan. 14, 1993, 03007399.
Patent abstracts of Japan, vol. 016, No. 461 (C–0988), Sept. 25, 1992 & JP 04 164803 A (Osaka Gas Co. Ltd.), Jun. 10, 1992 *abstract*.

* cited by examiner

*Primary Examiner*—Stanley S. Silverman
*Assistant Examiner*—Edward M. Johnson
(74) *Attorney, Agent, or Firm*—Wan Yee Cheung; Salvatore P. Pace; Philip H. Von Neida

(57) ABSTRACT

Partial oxidation of hydrocarbons to produce hydrogen and carbon monoxide is carried out by a fixed bed or a fluidized bed process which includes the steps of passing steam and/or carbon dioxide through a perovskite-type ceramic mixed conductor in an adsorption zone at an elevated temperature, thereby at least partially saturating the mixed conductor with oxygen and producing hydrogen and/or carbon monoxide, and subsequently contacting the hot, at least partially oxygen-saturated mixed conductor with a hydrocarbon in a partial oxidation reaction zone. During the partial oxidation reaction phase of the process, the sorbed oxygen reacts with the hydrocarbon, thereby producing hydrogen and carbon monoxide.

21 Claims, 2 Drawing Sheets

PRODUCTION OF HYDROGEN AND CARBON MONOXIDE

FIELD OF THE INVENTION

This invention relates to the partial oxidation of hydrocarbons, and more particularly to the production of hydrogen and carbon monoxide by the oxidation of hydrocarbons. Specifically, the invention relates to a process comprising contacting ceramic oxygen-selective mixed conductors with steam and/or carbon dioxide at high temperatures, thereby causing oxygen to be adsorbed by the mixed conductor, and subsequently producing hydrogen and carbon monoxide by contacting the oxygen-containing mixed conductor with hydrocarbons.

BACKGROUND OF THE INVENTION

Syngas and its components, hydrogen and carbon monoxide, are conventionally produced by the high temperature partial oxidation of hydrocarbons with controlled amounts of air or oxygen. Although air is less expensive and more convenient to use in partial oxidation reactions, it is less attractive than oxygen for such reactions because the large quantities of nitrogen that are produced when air is used as the oxidant must be subsequently separated from the product gas prior to its use. The cost of separation, purification and heat exchange equipment for product gas purification and recovery of heat energy from the nitrogen adds considerably to the cost of syngas production using air.

Although oxygen is more desirable than air as an oxidant for partial oxidation reactions, its use is not without disadvantage, in that oxygen must be imported into the system, or it must be generated on site, for example, by means of a cryogenic air separation plant or an adsorption system. In either alternative, using oxygen as the oxidant likewise adds considerably to the cost of the process.

On site production of oxygen using ceramic-based materials for applications such as hydrocarbon partial oxidation reactions has been recently reported. U.S. Pat. No. 5,714,091 discloses an oxygen-based hydrocarbon partial oxidation process in which the oxygen is produced on site by subjecting air to membrane separation using a membrane constructed of perovskite-type ceramic material. Oxygen, which is permeable to the membrane, passes through the membrane and is made to react with hydrocarbons on the downstream side of the membrane unit. The disadvantages of this method of oxygen production are the high cost of production of the membrane and the difficulty of producing membrane structures that are leak-proof.

The partial oxidation of hydrocarbons with oxygen retained in ceramic-based oxygen-selective mixed conducting substances, such as perovskite-type ceramics, is disclosed in copending U.S. patent application Ser. No. 09/175,175, filed Oct. 20, 1998, and Ser. No. 09/290,768, filed Apr. 13, 1999, the specifications of which are incorporated herein by reference.

In the above-described hydrocarbon partial oxidation processes, up to one-half mole of hydrogen and up to one mole of carbon monoxide, respectively, are produced for each hydrogen atom and each carbon atom contained in the hydrocarbon feed to the process. For instance, when methane is partially oxidized by the above-described processes, a maximum of two moles of hydrogen and one mole of carbon monoxide can be obtained for each molecule of methane. The equation for this reaction is:

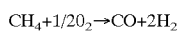

$$CH_4 + 1/2 O_2 \rightarrow CO + 2H_2$$

The present invention provides a hydrocarbon partial oxidation process which uses an oxygen-selective mixed conductor, but which has the advantage over the above-described processes of producing more hydrogen and/or more carbon monoxide for each mole of hydrocarbon feed to the process.

SUMMARY OF THE INVENTION

According to a broad embodiment, the invention comprises a process comprising the steps:

(a) contacting at least one oxygen ion-conducting ceramic with a feed gas comprising a component selected from the group consisting of steam, carbon dioxide, sulfur oxides, nitrogen oxides and mixtures thereof in an adsorption zone at a temperature in the range of about 300 to about 1400° C. and at an absolute pressure in the range of about 0.5 to about 50 bara, thereby at least partially saturating the at least one oxygen ion-conducting ceramic with oxygen and producing hydrogen, carbon monoxide, sulfur, nitrogen or mixtures thereof; and (b) removing oxygen from the at least partially oxygen saturated oxygen ion-conducting ceramic.

In a preferred embodiment, the at least one oxygen ion-conducting ceramic comprises an oxygen-selective mixed conductor. In a more preferred embodiment, the oxygen ion-conducting ceramic comprises a perovskite-type ceramic having the structural formula $A_{1-x}M_xBO_{3-\delta}$, where A is an ion of a metal of Groups 3a and 3b of the periodic table of elements or mixtures thereof; M is an ion of a metal of Groups 1a and 2a of the periodic table or mixtures thereof; B is an ion of a d-block transition metal of the periodic table or mixtures thereof; x varies from >0 to 1; and $\delta$ is the deviation from stoichiometric composition resulting from the substitution of ions of metals of M for ions of metals of A.

In another preferred embodiment, the oxygen is removed from the at least partially saturated mixed conductor by increasing the temperature in the adsorption zone, by decreasing the pressure in the adsorption zone, by contacting the at least partially oxygen saturated mixed conductor with a reducing agent or by combinations thereof In another preferred embodiment, the feed gas of step (a) is steam, carbon dioxide or mixtures thereof. In this preferred embodiment, step (b) of the process preferably comprises contacting the at least partially oxygen-saturated oxygen ion-conducting ceramic mixed conductor with a reducing agent comprising at least one organic compound selected from the group consisting of hydrocarbons, oxygen-containing hydrocarbons and mixtures thereof in a reaction zone at a temperature in the range of about 300 to about 1,400° C., thereby partially oxidizing the at least one organic compound and producing product gas comprising hydrogen, carbon monoxide or mixtures of these, and at least partially depleting the mixed conductor of oxygen.

In another preferred embodiment, the process is carried out by repeatedly performing steps (a) and (b) in sequence. In one preferred aspect, the process is carried out in a fixed bed comprising the at least one oxygen-selective mixed conductor, and the fixed bed serves as the adsorption zone during step (a) and as the reaction zone during step (b). In another preferred aspect, the process is carried out in a moving bed system, and it further comprises recycling the at least partially oxygen-depleted mixed conductor to the adsorption zone. Preferably, the moving bed system is a fluidized bed system and the at least partially oxygen-saturated mixed conductor is fluidized and carried into the reaction zone by the at least one organic compound, steam, carbon dioxide or mixtures thereof.

In a more preferred embodiment, the at least one oxygen ion-conducting ceramic is a perovskite-type ceramic and x varies from about 0.1 to 1.

In another more preferred embodiment, the at least one oxygen ion-conducting ceramic is a perovskite-type ceramic and A is one or more f-block lanthanides. In a more preferred embodiment, A is La, Y, Sm or mixtures thereof.

In another more preferred embodiment, the at least one oxygen ion-conducting ceramic is a perovskite-type ceramic and M is at least one metal of Group 2a of the periodic table of elements. In a more preferred embodiment M is Sr, Ca, Ba or mixtures thereof.

In another more preferred embodiment, the at least one oxygen ion-conducting ceramic is a perovskite-type ceramic and B is Ti, V, Cr, Mn, Fe, Co, Ni, Cu, Zn or mixtures thereof. In a more preferred embodiment, B is V, Fe, Ni, Cu or mixtures thereof.

In another more preferred embodiment, the at least one oxygen ion-conducting ceramic is a perovskite-type ceramic and x is about 0.2 to 1.

In another more preferred embodiment, the at least one oxygen ion-conducting ceramic is a perovskite-type ceramic and A is La, Y, Sm or mixtures thereof, M is Sr, Ca or mixtures thereof, and B is V, Fe, Ni, Cu or mixtures thereof.

In another embodiment, the at least one oxygen ion-conducting ceramic conductor is a member selected from the group consisting of (1) ceramic substances selected from the group consisting of $Bi_2O_3$, $ZrO_2$, $CeO_2$, $ThO_2$, $HfO_2$ and mixtures thereof, the ceramic substances being doped with CaO, rare earth metal oxides or mixtures of these; (2) brownmillerite oxides; and (3) mixtures of these.

In another embodiment, the at least one oxygen ion-conducting ceramic conductor is at least one ceramic substance selected from the group consisting of $Bi_2O_3$, $ZrO_2$, $CeO_2$, $ThO_2$, $HfO_2$ and mixtures of these, and the at least one ceramic substance is doped with a rare earth metal oxide selected from the group consisting of $Y_2O_3$, $Nb_2O_3$, $Sm_2O_3$, $Gd_2O_3$ and mixtures of these.

In another preferred embodiment, the process further comprises, after step (b), the additional step comprising stripping the at least partially oxygen-depleted mixed conductor with gas that is compatible with the product gas. In a more preferred embodiment, the stripping gas is steam, nitrogen, carbon dioxide or mixtures of these.

In another preferred embodiment, steps (a) and (b) of the process are carried out at a temperature in the range of about 500 to about 1,200° C. In another preferred embodiment, step (a) is carried out at an absolute pressure in the range of about 0.5 to 20 bara. In a more preferred embodiment, steps (a) and (b) are carried out at a temperature in the range of about 650 to about 1,100° C.

In another preferred embodiment, the at least one organic compound has an aliphatic, cycloaliphatic or aromatic structure and it contains 1 to 12 carbon atoms.

In another preferred embodiment, the at least one organic compound is aliphatic and contains 1 to 6 carbon atoms. In a more preferred embodiment, the at least one organic compound comprises methane, methanol, natural gas, at least one petroleum derivative or mixtures thereof.

In another preferred embodiment, the at least one organic compound comprises a petroleum derivative comprising naphtha, gasoline or mixtures thereof.

In another preferred embodiment, at least one agent which promotes the oxygen adsorption of step (a) and/or the partial oxidation of step (b), when step (b) is a partial oxidation step, is combined with the at least one oxygen ion-conducting ceramic. Preferably, the at least one agent is a transition metal. More preferably, the transition metal is Cu, Ag, Fe, Ni, Rh, Pt or mixtures thereof.

In another preferred embodiment, the at least one oxygen ion-conducting ceramic additionally contains a catalyst selective for partial oxidation reactions that produce partial oxidation reaction products other than hydrogen and carbon monoxide.

In another preferred embodiment, the process further comprises, during step (b), passing a moderating agent selected from steam, carbon dioxide and mixtures thereof through the at least one reaction zone. In a more preferred embodiment, the moderating agent is steam.

In another preferred embodiment, the feed gas of step (a) comprises the exhaust gas of a combustion process.

In another preferred embodiment, the process further comprises introducing air, oxygen-enriched air or substantially pure oxygen into the adsorption zone during step (a) or into the reaction zone during step (b), or into the adsorption zone and/or the reaction zone between steps (a) and (b).

DETAILED DESCRIPTION OF THE INVENTION

Figure 1:
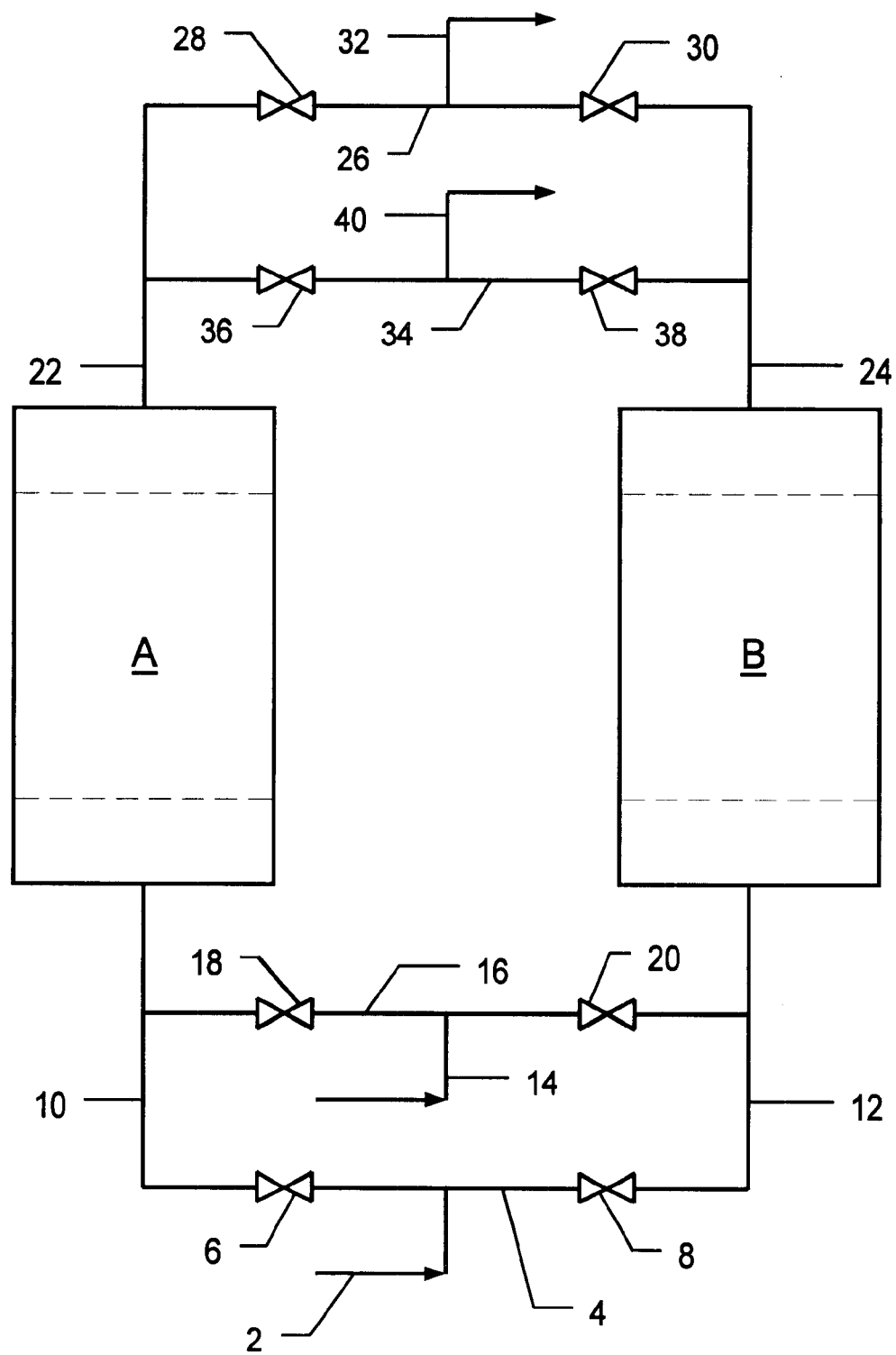
FIG. 1 is a schematic illustration of one system in which the process of the invention can be practiced, comprising a fixed bed partial oxidation reactor plant.
Figure 2:
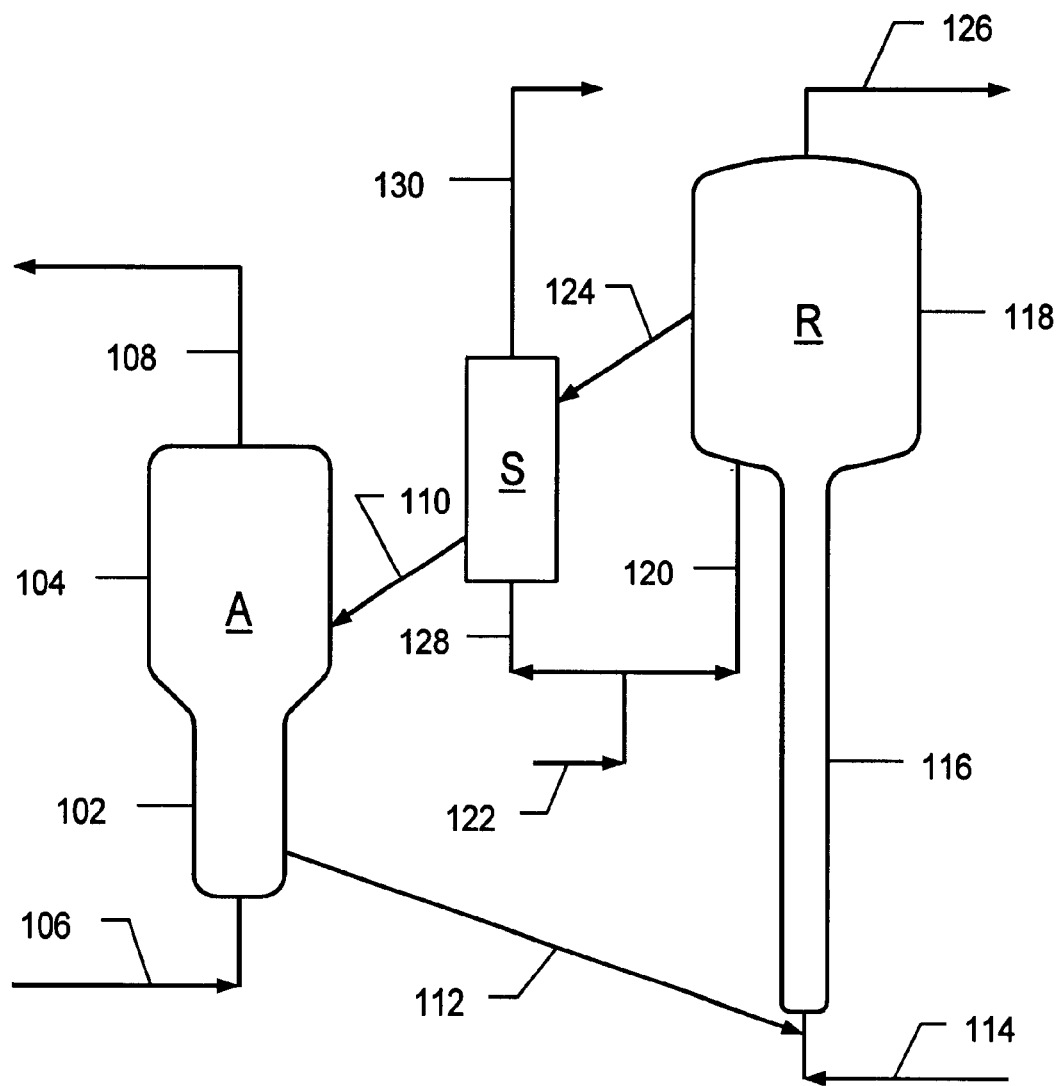
FIG. 2 is a schematic illustration of another system in which the process of the invention can be practiced, comprising a fluidized bed partial oxidation reactor plant including an oxygen adsorption unit and a hydrocarbon partial oxidation reactor.

The process of the invention, typically carried out in a fixed bed reactor system or a recirculating solids reactor system, comprises, in general, an oxygen abstraction/adsorption step and a oxygen recovery step or a hydrocarbon and/or an oxygen-containing hydrocarbon partial oxidation step. Although certain reactor systems are preferable to others for practice of the process of the invention, the particular system in which the process is carried out is a matter of choice. The configuration of the system forms no part of the invention. The oxygen adsorption step and the oxygen recovery step or hydrocarbon partial oxidation step of the process can be carried out in a fixed bed system, as illustrated in FIG. 1, or a moving bed system, as shown in FIG. 2.

When the process of the invention is carried out in a fixed bed system, it is preferably carried out as a two-step cyclical process comprising a high temperature oxygen abstraction/adsorption step and an oxygen recovery step or partial oxidation reaction step using the adsorbed oxygen as the oxidant. Suitable fixed bed systems include those comprising a single adsorption/reaction unit, those comprising a battery of adsorption/reaction units operated in phase and those comprising a plurality of adsorption/reactor units or batteries of adsorption/reaction units operated out of phase, whichever is desired. When a system comprising a single unit or a battery of units all of which are operated in phase is used, the adsorption and partial oxidation steps are necessarily intermittent, whereas when a plurality of units are employed in parallel and operated out of phase, one or more units can be in oxygen adsorption service while the partial oxidation reaction is being carried out in one or more other units. In preferred embodiments of the invention, adsorption/partial oxidation cycles are repeatedly carried out in a manner such that production of the desired partial oxidation products is substantially continuous.

Typical moving bed systems useful for practice of the process of the invention include interconnected multi-vessel systems including an oxygen abstraction/adsorption vessel and a partial oxidation reactor. In a preferred moving bed embodiment, the system is a fluidized bed system, and the partial oxidation reactor may include one or more of a riser section, a fluidized bed section and a moving bed section. Commonly, the reactor comprises both a riser section and a fluidized bed section. Similarly, the unit in which the oxygen adsorption step is carried out may comprise a riser section, a fluidized bed section, a moving bed section or combinations of these. Suitable recirculating bed designs and their operation are described in U.S. Pat. Nos. 4,668,802, 5,021,588 and 5,519,149, the disclosures of which are incorporated herein by reference.

The process of the invention can be used to produce oxygen from gases such as steam, carbon dioxide, sulfur oxides, nitrogen oxides. The feed gas from which the oxygen is produced can be, for example, an exhaust gas from a combustion process in which a fuel, such as coal, coke or petroleum derivatives, is burned. In one embodiment, the process of the invention is useful for carrying out partial oxidation processes that produce hydrogen and/or carbon monoxide, and perhaps additional partial oxidation products, using substantially pure oxygen that is abstracted and adsorbed by an oxygen ion conducting ceramic from steam and/or carbon dioxide. The oxygen adsorption step is carried out at high temperatures; accordingly, in this embodiment, the at least partially oxygen-saturated mixed conductor leaving the adsorption step is at or near the preferred reaction temperature for the partial oxidation step. In another embodiment, the process can be used to remove harmful components such as sulfur oxides and nitrogen oxides from gas streams, such as waste gases from combustion processes.

The term "oxygen ion-conducting ceramic" is used herein to define the class of ceramic materials which have an oxygen ionic conductivity of at least $10^{-5}$ S/cm (Siemens per centimeter)

Oxygen ion-conducting ceramics include ceramic materials selected from: (1) perovskite-type ceramics having the structural formula $A_{1-x}M_xBO_{3-\delta}$, where A is at least one ion of a metal of Groups 3a and 3b of the periodic table of elements, and it is preferably an f block lanthanide, i.e., rare earth elements, and it is more preferably La, Y, Sm or mixtures of these; M is at least one ion of a metal of Groups 1a and 2a of the periodic table, and it is preferably a Group 2a metal, and it is more preferably Sr, Ca, Ba or mixtures of these; B is at least one ion of a d-block transition metal of the periodic table, and it is preferably Ti, V, Cr, Mn, Fe, Co, Ni, Cu, Zn or mixtures of these, and it is more preferably V, Fe, Co, Ni, Cu or mixtures of these; x varies from >0 to 1; and $\delta$ is the deviation from stoichiometric composition resulting from the substitution of the ions of metal(s) of M for the ions of metal(s) of A; (2) ceramic materials selected from compounds such as $Bi_2O_3$, $ZrO_2$, $CeO_2$, $ThO_2$, $HfO_2$ and mixtures of these, wherein the ceramic material is doped with CaO, rare earth metal oxides, such as, for example, $Y_2O_3$, $Nb_2O_3$, $Sm_2O_3$, $Gd_2,O_3$ and mixtures of these; brownmillerite oxides; and mixtures of any of these.

In preferred embodiments, the adsorbent is an oxygen-selective mixed conductor, which, for purposes of this invention, is defined as a ceramic material which exhibits oxygen ion conductivity of at least $10^{-5}$ S/cm and electronic conductivity of at least $10^{-5}$ S/cm and whose oxygen ion conductivity and electronic conductivity do not differ from each other by more than two orders of magnitude. Properties of oxygen-selective mixed conductors are set forth in Lin et al., "Oxygen Permeation Through Thin Mixed Conducting Solid Oxide Membranes", AlChE Journal, May 1994, Vol. 40, No. 5, pp. 786–798, the text of which is incorporated herein by reference.

Most preferred oxygen-selective mixed conductors are those having the perovskite structure. In perovskite-type mixed conductors, the maximum oxygen adsorbing capability is attained when x of the perovskite structure has a value of 1. Although oxygen adsorption can occur when the value of x in the perovskite-type ceramic used in the process is 0, it is generally not commercially feasible to use perovskite-type ceramics having a value of x less than about 0.01 in the process of the invention. Preferably x has a value of about 0.1 to 1, and most preferably it has a value of about 0.2 to 1.

When the ceramic material is perovskite-type ceramic, the most preferred rare earth ions in the perovskite-type ceramic are La and Y; M is most preferably Sr and Ca; and B is most preferably Ni, Fe or Cu or mixtures of these.

Typical of perovskite-type ceramics suitable for use in the invention are $La_{1-x}Sr_xBO_{3-\delta}$, $Y_{1-x}Sr_xBO_{3-\delta}$, $Y_{1-x}Ca_xBO_{3-\delta}$ and combinations of these, wherein B is Ni, Fe, Cu or mixtures thereof. Specific useful perovskite-type ceramics are those having the structural formulas: $La_{0.8}Sr_{0.2}Ni_{0.8}Fe_{0.2}O_{3-\delta}$, $La_{0.7}Ca_{0.3}FeO_{3-\delta}$, $La_{0.8}Sr_{0.2}MnO_{3-\delta}$, $La_{0.7}Ca_{0.3}FeO_{3-\delta}$, $Y_{0.9}Sr_{0.1}CrO_{3-\delta}$, $SrCoO_3$, etc. In the last compound, $SrCoO_3$, x has a value of 1.

The oxygen ion conducting ceramic is preferably in particulate form, e. g., it can be powdered, granular, in pellet or bead form or other form which is suitable for use in fixed and/or moving bed processes. It may be in the form of substantially pure mixed conductor, or it may be agglomerated with any suitable binder material, i.e., any material which will not interfere with the performance of the mixed conductor or otherwise adversely affect the safety or performance of the system in which the mixed conductor is used.

The oxygen ion conducting ceramic may be treated with one or more substances which promote the oxygen abstraction and adsorption properties of the mixed conductor and/or the desired hydrocarbon partial oxidation and/or reforming reactions of the invention and/or other partial oxidation reactions. Suitable promoters include metals of high electric conductivity, such as the transition metals, particularly metals of Groups 1b and 8 of the periodic table of elements. Preferred promoters are Cu, Ag, Fe, Ni, Rh, Pt and mixtures of these. The promoter can be deposited onto the oxygen ion-conducting ceramic in the form of a coating or it can be combined with the ceramic in any other desired form. The particular promoter(s) applied to the ceramic and the method of combining them with the ceramic are not critical and form no part of the invention. For ease of discussion, the oxygen-ion conducting ceramic, with or without the oxygen adsorption and/or partial oxidation reaction promoter(s) and/or other additives, is sometimes simply referred to herein as the mixed conductor.

The minimum temperature at which the oxygen adsorption step of the process of the invention is carried out is generally at least about 300° C. This step is preferably carried out at temperatures of at least about 500° C., and is most preferably carried out at temperatures of at least about 650° C. The upper temperature limit for carrying out the oxygen adsorption step is below the temperature at which the oxygen-selective adsorbent begins to melt. Generally the maximum upper temperature is not in excess of about 1,400° C. Preferably, the oxygen adsorption step is carried out at temperatures not exceeding about 1,200° C., and this step is most preferably carried out at temperatures not in excess of about 1,100° C.

In the organic compound partial oxidation embodiment, the partial oxidation step is generally carried out at or near the temperature at which the adsorption step is carried out. It is often desirable to control the temperature at which the partial oxidation reaction is carried out, to minimize production of carbon dioxide and formation of carbon deposits on the mixed conductor. One method of controlling the partial oxidation temperature is by use of heat exchange means, which, for example, may be in the form of tubing, preferably positioned in the upper section of the reactor.

Another, and often preferred method of controlling the temperature in the reactor is to introduce a moderating agent, such as steam or carbon dioxide, into the reactor. This provides the additional benefit of reforming the hydrocarbon reactant to produce additional hydrogen and/or carbon monoxide. The moderating agent can be introduced into the reactor at various points, as described below in more detail.

The pressure at which the adsorption step of the process is carried out is a matter of choice and, in general, is not critical. Typically, this step is carried out at a pressure at or above about 1 bar, absolute (bara). The minimum pressure at which the adsorption step is carried out is preferably about 0.5 bara and is most preferably about 5 bara. The upper pressure limit of the adsorption step of the process is determined by economics and limitations of the reaction system and, in general, this step is desirably carried out at absolute pressures not in excess of about 50 bara, is preferably carried out at pressures not in excess of about 20 bara, and is most preferably carried out at pressures not in excess of about 15 bara.

The pressure at which the partial oxidation step is carried out is likewise a matter of choice and not critical. In general, the adsorption step and the partial oxidation step are usually carried out at substantially the same pressure.

In the organic compound partial oxidation embodiment, the particular organic compound used as feed in the partial oxidation step of the process of the invention is a matter of choice. The organic compound is usually a hydrocarbon, or an oxygen-containing compound. For ease of discussion, this reactant will generally be referred to hereinafter simply as "hydrocarbon". The hydrocarbon may be any aliphatic, cycloaliphatic or aromatic hydrocarbon having 1 to 12 or more carbon atoms, and it may be saturated or ethylenically unsaturated and straight chain or branched chain. In preferred embodiments of the invention, the hydrocarbon is in the gaseous state under the conditions at which the partial oxidation reaction takes place. Oxygen-containing hydrocarbons which may be used as feed for the partial oxidation reaction include alcohols, ethers, aldehydes, ketones, carboxylic acids, etc. Preferred aliphatic hydrocarbons include those having 1 to 6 carbon atoms, and preferred aromatic hydrocarbons include those having up to twelve carbon atoms. More preferred hydrocarbons are those having 1 to 4 carbon atoms. Typical hydrocarbons include methane, methanol, ethane, propane, the butanes, benzene, the xylenes, refined petroleum fractions, such as naphtha and gasoline, methanol, ethanol, etc. Preferred hydrocarbon feeds include methane, methanol, ethane, ethene, propane, propene, n-butane, i-butane, n-butylene, I-butylene, butadiene, the pentanes, pentenes, hexanes and hexenes,. Most preferred hydrocarbon feeds for the production of hydrogen and carbon monoxide by the process of the invention are methane, methanol and natural gas.

Since oxygen-containing gases other than air or mixtures of oxygen and other gases are used as the source of oxygen for the hydrocarbon partial oxidation processes, there is no danger of forming an explosion hazard at any point in the process. Accordingly, there is no need to include a stripping step between the partial oxidation step and the oxygen abstraction/adsorption step to remove residual unreacted hydrocarbon and/or partial oxidation reaction product from the mixed conductor. However, a post-partial oxidation stripping step can be included in the process, if desired. This can be accomplished, for example, by stripping the spent adsorbent with a gaseous substance that is compatible with the partial oxidation product gas. By "compatible" is meant that the gaseous substance can be used in the process of the invention without creating undue safety hazards, and it is easily separable from the product gas or its presence in the product gas is not objectionable with respect to the intended use or further processing of the product gas. Suitable stripping gases include steam and carbon dioxide.

It may also be desirable to include an evacuation step in place of or in addition to the stripping step to more completely recover any product gas remaining in the mixed conductor after the partial oxidation step. The evacuation step can be carried out to any desired pressure. For example, the pressure can be reduced to about 0.1 bara or lower, but, for economic purposes, it is preferably not reduced to below about 0.2 bara at this stage of the process.

As mentioned above, a reaction moderating agent, such as steam or carbon dioxide or both of these can be passed through the reaction zone in addition to the hydrocarbon during the second step of the process. This is desirable when the quantity of oxygen present in the mixed conductor is insufficient to convert all of the hydrocarbon to the desired partial oxidation products and/or when coking of the mixed conductor occurs in the reactor. The advantage of this variation is that reforming of the hydrocarbon and/or conversion of carbon deposits on the mixed conductor to carbon monoxide occurs in addition to partial oxidation of the hydrocarbon.

Steam and carbon dioxide used as moderating agents react with unreacted hydrocarbon and carbon deposits on the mixed conductor to produce additional hydrogen and/or carbon monoxide by, for example, one or more of the following reactions, when the hydrocarbon is methane:

$$CH_4 + H_2O \rightarrow CO + 3H_2$$

$$CH_4 + CO_2 \rightarrow 2CO + 2H_2$$

$$C + H_2O \rightarrow CO + H_2$$

$$C + CO_2 \rightarrow 2CO$$

The moderating agent can be introduced into the partial oxidation reactor with or separately from the hydrocarbon. In fluidized bed embodiments, the at least partially oxygen-saturated mixed conductor can be fluidized and carried into the partial oxidation reactor by the gaseous hydrocarbon reactant and/or by the steam and/or carbon dioxide. The steam and/or carbon dioxide reforming reaction can take place even after substantially all of the sorbed oxygen is consumed by the partial oxidation reaction. Since the reforming reaction is endothermic, it may be desirable or necessary in some cases to provide supplemental heat to the reaction zone to compensate for heat consumed in the reforming reaction. Supplemental heat can be provided by any suitable means, such as by the use of heaters.

If desired, the partial oxidation step of the process can be used to produce partial oxidation products in addition to carbon monoxide and hydrogen. This can be accomplished by combining a catalyst which promotes the desired additional partial oxidation reaction with the oxygen ion conducting ceramic and using the appropriate hydrocarbon as the feed stream.

The invention can be more easily understood by reference to the appended drawings, considered in conjunction with the following description. Equipment that is not necessary for an understanding of the invention, such as auxiliary valves, storage vessels and pumps, have not been included in the illustrated system.

Turning now to the drawings, and particularly to FIG. 1, illustrated therein is a two vessel partial oxidation system comprising reaction vessels A and B, arranged in parallel. Vessels A and B are packed with a particulate adsorbent of the type described above, for example a perovskite ceramic material. At the inlet end, the system is provided with steam/carbon dioxide feed line 2, which is connected to manifold 4. Manifold 4 can be put into fluid communication with reaction vessel feed lines 10 and 12 via valves 6 and 8, respectively. Lines 10 and 12 are connected to the inlet ends of reaction vessels A and B, respectively. The inlet end of the system is also provided with hydrocarbon feed line 14, which is attached to manifold 16 at a point between valves 18 and 20, also provided in manifold 16. Manifold 16 can be put into fluid communication with lines 10 and 12 via valves 18 and 20, respectively.

On their outlet ends, vessels A and B are connected to lines 22 and 24, respectively. Lines 22 and 24 are connected to manifold 26, and flow control to manifold 26 from lines 22 and 24 is provided by valves 28 and 30, which are attached to manifold 26. Also attached to manifold 26, at a point between valves 28 and 30, is hydrogen/carbon monoxide discharge line 32. Lines 22 and 24 are also joined to manifold 34. Lines 22 and 24 can be put into fluid communication with manifold 34 through valves 36 and 38, respectively. Manifold 34 is connected to partial oxidation reaction product gas line 40 at a point between valves 36 and 38.

The system illustrated in the drawing is designed to be operated in semi-continuous fashion, with reactors A and B being operated 180° out of phase, so that reactor A is in oxygen adsorption-hydrogen/carbon monoxide production service while reactor B is in partial oxidation reaction service, and vice versa. The process of the invention, as carried out in the system illustrated in FIG. 1, will be described in detail as a two-stage hydrocarbon partial oxidation process comprising a first stage, in which reactor A is in oxygen adsorption-hydrogen/carbon monoxide production mode and reactor B is in partial oxidation reaction mode, and a second stage, in which reactor B is in oxygen adsorption-hydrogen/carbon monoxide production mode and reactor A is in partial oxidation mode.

At the beginning of the first stage, valves 6, 20, 28 and 38 are open and all other valves are closed. Steam or carbon dioxide, introduced into the system through line 2, passes through line 10 and enters vessel A. While the adsorption-hydrogen/carbon monoxide production stage of the process is being carried out in vessel A, the oxygen ion conducting ceramic in vessel A is maintained at a temperature in the range of about 500 to about 1400° C.

Since the overall process is endothermic, it is usually necessary to apply heat to the system to maintain the adsorbent at the desired temperature. Heat can be provided in a variety of ways. For example, heat can be provided to the system by direct or indirect heating techniques. A preferred direct heating procedure is to combust a fuel, such as coal, coke, fuel oil or other hydrocarbon-based fuels, etc., and introduce the hot exhaust gas from the combustion process directly into the chamber in which the abstraction/adsorption process is carried out. This procedure has the dual advantage of providing heat and supplying the feed gas for the oxygen abstraction step. The combustion process is preferably carried out in the full combustion mode to maximize production of carbon dioxide and steam. Other oxygen-containing gases, such as sulfur and nitrogen oxides may also be present in the hot exhaust gas. As noted above, oxygen can also be abstracted from these components. Another method of providing heat to the reaction zone is to introduce supplemental oxygen into the reaction zone during the oxygen adsorption step or during the hydrocarbon partial oxidation step or between these steps. Adsorption of the oxygen provides heat in the adsorption step and additional combustion of the hydrocarbon with supplemental oxygen provides heat in the second step of the process. Other heating techniques that can be used in the process include internal and external indirect heaters, such as electric and/or fuel- fired heaters whose coils pass through the bed of mixed conductor. Heat can also be applied by using heated feeds, such as superheated steam. Another useful heating procedure is to incorporate the reaction zone in a furnace zone. The method used to provide heat to the reaction zone is a matter choice and forms no part of this invention.

Distribution of heat in the reaction zone can, if desired, be facilitated by incorporating a material having a high thermal conductivity into the reaction zone. As mentioned above, this can be accomplished by mixing or sandwiching, i.e. layering, the mixed conductor with a high temperature stable material, such as a heat conducting ceramic material or a particulate metal material. Heat distribution in the reaction zones can also be assisted by strips or rods of metallic material inserted in, upstream of or downstream of the reaction zones. If it is desirable or necessary to remove heat from the reaction zone to prevent excessive heating of the mixed conductor contained therein, this can be accomplished by means of the above-described heat transmission means.

In any event, the steam and/or carbon dioxide feedstream entering vessel A passes upwardly through the oxygen ion conducting ceramic contained therein, and as it does so, oxygen is abstracted from the steam and/or carbon dioxide by the mixed conductor and hydrogen and/or carbon monoxide are produced. The hydrogen and/or carbon monoxide leaves vessel A through line 22 and passes out of the system through manifold 26 and line 32 and is sent to storage or further processing or to a downstream application. As the adsorption step proceeds in vessel A, the adsorbed oxygen forms a front which advances through the bed of mixed conductor toward the nonadsorbed product outlet end of vessel A.

While the oxygen abstraction step is taking place in vessel A the partial oxidation step is initiated and carried on in vessel B. During this stage of the cycle, hydrocarbon feed is introduced into vessel B through lines 14 and 12. If desired, the hydrocarbon feed may be compressed to the desired pressure by any suitable means, such as by a compressor or gas blower, or the gas may be provided from its source as a pressurized gas stream. As the hydrocarbon gas contacts the at least partially oxygen-saturated mixed conductor in vessel B, it reacts with the oxygen sorbed onto the mixed conductor to produce the desired partial oxidation gas product, which is generally a mixture of hydrogen and carbon monoxide. The product gas stream may also contain other gaseous by-products, such as carbon dioxide and moisture, but the concentration of these by-products can be minimized by maintaining optimum reaction conditions in the reaction vessel. The hot reaction gases pass out of vessel B through lines 24 and 40 and they pass, for example, to storage together with or separately from the hydrogen and/or carbon monoxide being discharged from vessel A, or they can be sent to downstream processing units. As the partial oxidation reaction progresses in vessel B, the mixed conductor in this vessel is regenerated by at least partial depletion of the sorbed oxygen therefrom.

At a predetermined point in the first stage of the process, such as when the adsorbed oxygen front reaches a desired point in vessel A, or when all of the oxygen in vessel B is reacted with hydrocarbon, the first stage of the cycle is terminated and the second stage begins. By proper sizing of the reaction vessels and careful control of the reactant gas flow rates, etc., the process can be designed so that the adsorption step in vessel A reaches its desired end point at substantially the same time that all of the sorbed oxygen in vessel B is reacted. Alternatively, if the adsorption step in vessel A reaches its desired end point before the oxygen in vessel B is completely reacted, or vice versa, the completed part of the first stage of the process can be terminated and further activity in that vessel can be suspended until the other part of the first stage reaches its desired end point.

Upon completion of the first stage of the process, the second stage is begun. During the second stage valves 8, 18, 30 and 36 are open and all other valves are closed. Steam and/or carbon dioxide, introduced into the system through line 2, now passes through line 12 and enters vessel B. As the steam and/or carbon dioxide passes through vessel B, oxygen is adsorbed by the regenerated mixed conductor in this vessel. Hydrogen and/or carbon monoxide now passes out of vessel B through line 24 and leaves the system through line 32. Meanwhile, the partial oxidation step is initiated and carried on in vessel A. During this stage of the cycle, hydrocarbon is introduced into vessel A through lines 14 and 10. As the hydrocarbon contacts the hot mixed conductor in vessel A, it reacts with the oxygen sorbed onto the mixed conductor to produce the desired partial oxidation gas product The hot reaction gases pass out of vessel A through line 22 and passes out of the system through line 40.

When the desired stage 2 end point is reached, the second stage of the process (and the current cycle) ends and the next cycle begins with vessel A in oxygen adsorption-hydrogen/carbon monoxide production mode and vessel B in partial oxidation reaction mode.

As mentioned above, it may sometimes be desired to reform unreacted hydrocarbon or partially oxidize carbon deposits on the mixed conductor in the vessel in which the partial oxidation reaction is being carried out. Reforming can be carried out by introducing steam or carbon dioxide as moderating agent into the vessel undergoing the partial oxidation reaction together with the hydrocarbon being fed to this vessel. This can be accomplished, for example, by opening valve 6, while the partial oxidation is being carried out in vessel A, or valve 8, while the partial oxidation is being carried out in vessel B.

Since, as noted above, these reactions are endothermic, additional heating of the reactants may be required. Although most or all of the additional heat required for the reactions can be provided by the hydrocarbon partial oxidation reaction, supplemental heating can be provided, if necessary, by other heating means (not shown).

FIG. 2 illustrates a system for practice of the process of the invention by the fluidized bed technique. The system of FIG. 2 includes, as principal units, oxygen abstractor/adsorber A, partial oxidation reactor R, and optional steam stripper S. Vessel A, as noted above, can be any type of equipment which provides intimate contact between a particulate material and a gas. In the system illustrated in FIG. 2, vessel A includes dense phase section 102, positioned at the lower end of the vessel, and dilute phase section 104, located above dense phase section 102. Vessel A is also provided with steam/carbon dioxide inlet line 106, hydrogen/carbon monoxide outlet line 108, oxygen-depleted mixed conductor return line 110 and oxygen-containing mixed conductor line 112. Line 112 is connected to the lower part of hydrocarbon feed inlet line 114, which, in turn, is connected to the lower part of partial oxidation reactor R.

Reactor R can be any type of reactor suitable for carrying out moving catalyst bed partial oxidation reactions. In the system illustrated in the drawing, reactor R includes riser section 116 and dilute phase section 118, positioned above riser section 116. In embodiments of the invention in which hydrocarbon reforming is practiced as part of the process, it may be carried out in part of, for example in the upper portion of, section 118. In such embodiments, reactor R can be provided with moderating gas inlet line 120, the upstream end of which is connected to moderating gas supply line 122. Section 118 is also provided with oxygen-depleted mixed conductor discharge line 124 and product gas discharge line 126. The downstream end of line 124 is connected to oxygen-depleted mixed conductor stripper S.

When stripper S is included in the system, it can be any vessel suitable for stripping a particulate material with a stripping gas. Stripper S is provided with stripping gas inlet line 128, the upstream end of which, in the embodiment illustrated in FIG. 2, is connected to moderating gas supply line 122, and stripping gas outlet line 130, The upstream end of oxygen-depleted mixed conductor line 110 is connected to stripper S.

In practicing the process of the invention in the system illustrated in FIG. 2, particulate mixed conductor of the type described above is circulated in fluidized form through the system comprising abstractor/adsorber A, reactor R and stripper S. In vessel A, recycled mixed conductor is contacted with steam and/or carbon dioxide at a temperature and pressure in the ranges specified above. The steam and/or carbon dioxide enters vessel A through line 106 and passes upwardly through this vessel. The desired adsorption temperature can be initially established in vessel A by any suitable means, such as by superheating the steam or heating the carbon dioxide entering this vessel or by internal or external heating means, as described above in the description of the FIG. 1 system. The method used to heat the steam and/or carbon dioxide and/or the mixed conductor in vessel A during, for example, start-up is a matter of choice and forms no part of this invention.

The steam and/or carbon dioxide entering vessel A passes upwardly through dense phase zone 102, and as it does so, it comes into intimate contact with mixed conductor that is descending through zone 102. As indicated above, the counterflow arrangement illustrated in the drawing is only one of several methods of steam/carbon dioxide-mixed conductor contact that can be employed. As the steam and/or carbon dioxide contacts the mixed conductor, oxygen abstracted from the steam and/or carbon dioxide is adsorbed by the mixed conductor, thereby at least partially saturating the mixed conductor with oxygen. The hydrogen and/or carbon monoxide produced during the oxygen abstraction rises into dilute phase zone 104 where it separates from the particulate mixed conductor. One or more cyclone separators can be positioned in the upper part of section 104 to facilitate separation of the hydrogen and/or carbon monoxide from the mixed conductor. The hydrogen and/or carbon monoxide exits vessel A through line 108, and is sent to storage or to downstream processing.

The hot, at least partially oxygen saturated mixed conductor passes through line 112 and enters line 114. The mixed conductor mixes with gaseous hydrocarbon feed, for example, methane, entering reactor R through line 114, and the mixture flows upwardly through riser section 116 of reactor R. As the hot mixed conductor and hydrocarbon mix, the hydrocarbon undergoes partial oxidation, producing a gas mixture comprised substantially of carbon monoxide and hydrogen, according to the following equation, in which the hydrocarbon is methane:

$$2CH_4(g) + O_2(s) \rightarrow 2CO(g) + 4H_2(g)$$

The temperature and rate of mixed conductor and hydrocarbon flow through reactor R are preferably maintained at levels that maximize production of hydrogen and/or carbon monoxide and minimize the formation of carbon dioxide and coking of the mixed conductor. After passing through riser 116 of reactor R, the mixed conductor-gas mixture enters dilute phase section 118, where the velocity of the mixture decreases sufficiently to effect separation of the mixed conductor and gas phase. As was the case in vessel A, separation of the mixed conductor and product gas can be assisted by means of gas separators, such as cyclone separators situated at the top of fluid section R. The product gas passes out of reactor R through line 126 and is sent to storage or to a downstream application. If desired, the product gas stream can be sent to adsorption or other gas separation means to recover unreacted hydrocarbon therefrom. The recovered hydrocarbon can be recycled to reactor R, if desired.

The at least partially oxygen-depleted mixed conductor separated from the gas product leaves reactor R through line 124 and may return directly to vessel A or it may enter stripper S. In the latter case, the spent mixed conductor passes through stripper S, where entrained product gas is stripped therefrom by steam or carbon dioxide or other appropriate stripping gas, introduced into stripper S through line 128. The stripped gas-stripping agent mixture passes out of stripper S through line 130, and is sent to storage or otherwise processed or disposed of.

The clean mixed conductor is recycled to vessel A through line 110. Fresh mixed conductor can be introduced into the system at any desired point, for example by adding it to vessel A through fresh mixed conductor filling means (not shown).

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a volume basis. Gas flow rates are at standard temperature and pressure. Example 1 is based on experimental results and Example 2 is hypothetical.

EXAMPLE 1

This experiment was carried out in a fixed-bed reactor similar to the system illustrated in FIG. 1, except that a single reactor was used. The reactor, which has an inner diameter of 1.6 inches and a length of 24 inches, was packed with about 200 g of $La_{0.8}Sr_{0.2}Ni_{0.8}Fe_{0.2}O_{3-\delta}$ perovskite-type ceramic material, coated with 5 wt % Ni. The ceramic material was in the form of a monolithic structure. Operation of the reactor system was controlled by a PLC programming controlling system and a computer, and feed flow rates and the reactor temperature were controlled by mass flow controllers and temperature controllers.

The experiment was carried out in two steps, an oxygen abstraction/adsorption step and a methane partial oxidation step. During the oxygen abstraction/adsorption step, which lasted about 6.8 minutes, a steam-nitrogen mixture containing 80% nitrogen was introduced into the reactor at a flow rate of 1.5 l/min (liters per minute, dry basis). During the methane partial oxidation step, which lasted about 1 minute, a methane-steam mixture containing 20% steam was introduced into the reactor at a flow rate of 2 l/min. The reactor temperature was maintained at 800° C. by means of an electric furnace. The pressure in the reactor was maintained at about 8 psig. The effluent gas composition was instantaneously measured by a gas analyzer. During the oxygen abstraction/adsorption step, product gas having an average composition of 15.5% $H_2$ and 84.5% $N_2$ (on a dry basis) exited the reactor at an average flow rate of about 1.4 l/min. During the methane partial oxidation step, product gas having an average composition of 68.4% $H_2$, 27.5% CO and 4.16% $CO_2$ (on a dry basis) exited the reactor at an average flow rate of 4.9 l/min. Steam conversion during the oxygen abstraction/adsorption step was about 74% while steam and methane conversions during the methane partial oxidation step were respectively 62% and 97%.

EXAMPLE 2

This example is simulated using a circulating reactor similar to the system illustrated in FIG. 2, but without an adsorbent stripping zone. The oxygen selective mixed conductor is assumed to be a particulate perovskite ceramic of the formula $La_{0.8}Sr_{0.2}Ni_{0.8}Fe_{0.2}O_{3-\delta}$ (coated with 5 wt % Ni) having a particle size of about 20 to 100 microns. The oxygen abstraction/adsorption and partial oxidation reaction zones are each assumed to be maintained at a temperature of about 850° C. The selected pressure in the adsorption zone is about 20 psig, and the pressure in the reaction zone is lower than the pressure in the adsorption zone. Simulated steam feed to the adsorption zone of the system is 13.93 l/min and simulated methane feed to the reactor zone is 10 l/min. The selected solids residence time in the adsorption zone is in the range of 10 sec. to 10 min., and that in the reaction zone is in the range of 20 sec. to 20 min. The selected gas residence time in the adsorption zone is in the range of 0.001 to 10 sec., and that in the reaction zone is in the range of 0.01 to 100 sec.

Based on these conditions, a product stream at a flow rate of about 28.5 l/min and containing 65.5% hydrogen, 29.5% carbon monoxide, 1.72% methane, 3.28% carbon dioxide (on a dry basis) is projected to be produced. The exhaust gas from the adsorption zone is projected to be 10.45 l/min and it is projected to be almost pure hydrogen (on a dry basis). Methane and steam conversions are selected respectively to be 95% and 75%. Hydrogen selectivity is projected to be 100%, and carbon monoxide selectivity is selected to be 90%.

EXAMPLE 3

This experiment was carried out in the reactor system described in Example 1, except that 50 g of $La_{0.8}Sr_{0.2}Co_{0.5}Fe_{0.5}O_{3-\delta}$ perovskite-type ceramic material was used as the mixed conductor. The experiment was carried out in two steps, an oxygen abstraction/adsorption step and a methane partial oxidation step. During the oxygen abstraction/adsorption step, which lasted about 3 minutes, $CO_2$ was introduced into the reactor at a flow rate of 1.0 l/min (liters per minute). During the methane partial oxidation step, which lasted about 2 minutes, a methane-steam mixture was introduced into the reactor at a flow rate of 1.0 l/min. The reactor temperature was maintained at 1000° C. by means of an electric furnace. The pressure in the reactor was maintained at about 9 psig. The effluent gas composition was instantaneously measured by a gas analyzer. During the oxygen abstraction/adsorption step, product gas having an average composition of 18.9% $CO_2$ and 81.1% CO exited the reactor at an average flow rate of about 1.26 l/min. During the methane partial oxidation step, product gas having an average composition of 71.5% $H_2$, 25.6% CO, 0.7% $CO_2$ and 2.2% $CH_4$ (on a dry basis) exited the reactor at an average flow rate of 2.58 l/min. $CO_2$ conversion during the oxygen extraction/adsorption step was about 76% while methane conversion during the methane partial oxidation step was 94.2%.

These examples illustrate steam/carbon dioxide decomposition to oxygen and hydrogen/carbon monoxide, and partial oxidation of methane to hydrogen and carbon monoxide in both fixed-bed and fluidized bed reactors using particulate perovskite-type ceramic material as the oxygen adsorbent.

Although the invention has been described with particular reference to a specific equipment arrangement and to specific examples, these features are merely exemplary of the invention and variations are contemplated. For instance, the invention can be practiced by conducting the hydrocarbon partial oxidation step in the liquid phase. Furthermore, as stated above, the process of the invention can be carried out in systems which are variations of the systems illustrated in the drawings. The scope of the invention is limited only by the breadth of the appended claims.

What is claimed is:

1. A process for forming a product gas containing a member selected from the group consisting of hydrogen, carbon monoxide, and mixtures thereof, comprising:
    (a) passing a feed gas comprising a member selected from the group consisting of steam, carbon dioxide, and mixtures thereof, through particulates comprising an oxygen ion-conducting ceramic to form said product gas by abstracting oxygen from said member of said feed gas to at least partially saturate said ceramic particulates with oxygen, wherein said hydrogen in said product gas is formed from said steam and said carbon monoxide in said product gas is formed from said carbon dioxide, and said ceramic particulates are maintained at a temperature between about 300 and about 1400° C. and at an absolute pressure between about 0.5 and about 50 bars;
    (b) removing oxygen from said ceramic particulates by performing at least one of: increasing said temperature, decreasing said pressure, passing a reducing agent through said ceramic particulates, or combinations thereof; and
    alternating between steps (a) and (b).

2. The process of claim 1, wherein said oxygen ion-conducting ceramic comprises a perovskite-type oxygen-selective mixed conductor having a structural formula $A_{1-x}M_xBO_{3-\delta}$, where A is an ion of a metal of Groups 3a and 3b of the periodic table of elements or mixtures thereof; M is an ion of a metal of Groups 1a and 2a of the periodic table or mixtures thereof; B is an ion of a d-block transition metal of the periodic table or mixtures thereof; x varies from >0 to 1; and δ is the deviation from stoichiometric composition resulting from the substitution of ions of metals of M for ions of metals of A.

3. The process of claim 2, wherein A is La, Y, Sm or mixtures thereof.

4. The process of claim 2, wherein M is Sr, Ca, Ba or mixtures thereof.

5. The process of claim 2, wherein B is V, Fe, Ni, Cu or mixtures thereof.

6. The process of claim 2, wherein at least one agent which promotes the abstracting of oxygen in step (a) is combined with said oxygen-selective mixed conductor, and said at least one agent is a transition metal.

7. The process of claim 6, wherein said transition metal is selected from the group consisting of Cu, Ag, Fe, Ni, Rh, Pt and mixtures thereof.

8. The process of claim 1, further comprising introducing air, oxygen-enriched air or substantially pure oxygen during step (a), during step (b), or between steps (a) and (b).

9. The process of claim 1, wherein said oxygen ion-conducting ceramic is a member selected from the group consisting of (1) ceramic substances selected from the group consisting of $Bi_2O_3$, $ZrO_2$, $CeO_2$, $ThO_2$, $HfO_2$ and mixtures thereof; (2) brownmillerite oxides; and (3) mixtures thereof.

10. The process of claim 1, wherein said oxygen ion-conducting ceramic is at least one ceramic substance selected from the group consisting of $Bi_2O_3$, $ZrO_2$, $CeO_2$, $ThO_2$, $HfO_2$ and mixtures thereof, and said at least one ceramic substance is doped with a rare earth metal oxide selected from the group consisting of $Y_2O_3$, $Nb_2O_3$, $Sm_2O_3$, $Gd_2O_3$ and mixtures thereof.

11. A process for forming a product gas containing a member selected from the group consisting of hydrogen, carbon monoxide and mixtures thereof, comprising:
    (a) passing a feed gas comprising a member selected from the group consisting of steam, carbon dioxide, and mixtures thereof, through particulates comprising an oxygen ion-conducting ceramic to form said product gas by abstracting oxygen from said member of said feed gas to at least partially saturate said ceramic particulates with oxygen, wherein said hydrogen in said product gas is formed from said steam and said carbon monoxide in said product gas is formed from said carbon dioxide, and said ceramic particulates are maintained at a temperature between about 300 and about 1400° C. and at an absolute pressure between about 0.5 and about 50 bars;
    (b) passing a reducing agent comprising an organic compound selected from the group consisting of hydrocarbons, oxygen-containing hydrocarbons and mixtures thereof, though said at least partially oxygen saturated ceramic particulates at a temperature between about 300 and about 1400° C. to partially oxidize said organic compound by reacting with oxygen from said at least partially oxygen saturated ceramic particulates to form additional hydrogen and carbon monoxide, thereby at least partially depleting oxygen from said ceramic particulates; and
    alternating between steps (a) and (b).

12. The process of claim 11, wherein said feed gas is a mixture of steam and carbon dioxide and said product gas is a mixture of hydrogen and carbon monoxide.

13. The process of claim 11, further comprising introducing air, oxygen-enriched air or substantially pure oxygen during step (a), during step (b) or between steps (a) and (b).

14. The process of claim 11, wherein said particulates comprising said oxygen ion-conducting ceramic are provided in a fixed bed configuration.

15. The process of claim 11, wherein said particulates comprising said oxygen ion conducting ceramic are provided in a moving bed system, and said at least partially oxygen-depleted ceramic particulates from said step (b) are recycled for use in said step (a).

16. The process of claim 11, wherein said organic compound has an aliphatic, cycloaliphatic or aromatic structure and it contains 1 to 12 carbon atoms.

17. The process of claim 16, wherein said organic compound comprises natural gas, methane, methanol, at least one petroleum derivative or mixtures thereof.

18. The process of claim 11, wherein said oxygen ion conducting ceramic comprises an oxygen-selective mixed conductor, and at least one agent which promotes the partial oxidation of step (b) is combined with said oxygen-selective mixed conductor, and said at least one agent is a transition metal.

19. The process of claim 18, wherein said transition metal is selected from the group consisting of Cu, Ag, Fe, Ni, Rh, Pt, and mixtures thereof.

20. The process of claim 11, wherein said oxygen-selective mixed conductor additionally contains a catalyst selective for partial oxidation reactions that produce partial oxidation reaction products other than hydrogen and carbon monoxide.

21. The process of claim 11, further comprising passing a moderating agent selected from steam, carbon dioxide and mixtures thereof through said partially oxygen saturated ceramic particulates during step (b).

* * * * *